(12) United States Patent
Yamada et al.

(10) Patent No.: US 11,294,198 B2
(45) Date of Patent: Apr. 5, 2022

(54) OPTICAL APPARATUS FOR DISPLAYING AN IMAGE IN THE AIR

(71) Applicant: FUJIFILM Corporation, Tokyo (JP)

(72) Inventors: Naoyoshi Yamada, Kanagawa (JP); Takashi Yonemoto, Kanagawa (JP); Hirofumi Toyama, Kanagawa (JP); Yukito Saitoh, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 254 days.

(21) Appl. No.: 16/540,390

(22) Filed: Aug. 14, 2019

(65) Prior Publication Data

US 2019/0369409 A1 Dec. 5, 2019

Related U.S. Application Data

(63) Continuation of application No. PCT/JP2018/005284, filed on Feb. 15, 2018.

(30) Foreign Application Priority Data

Feb. 15, 2017 (JP) .............................. JP2017-026213

(51) Int. Cl.
*G02B 30/56* (2020.01)
*G02B 5/124* (2006.01)
(Continued)

(52) U.S. Cl.
CPC .............. *G02B 30/56* (2020.01); *G02B 5/124* (2013.01); *G02B 5/3083* (2013.01); *G02B 27/283* (2013.01)

(58) Field of Classification Search
CPC ........ G02B 30/56; G02B 30/50; G02B 30/40; G02B 30/60; G02B 30/00; G02B 5/124;
(Continued)

(56) References Cited

U.S. PATENT DOCUMENTS 4,509,837 A 4/1985 Kassies
6,421,182 B1 7/2002 Holden
(Continued)

FOREIGN PATENT DOCUMENTS

JP 59-500189 A 2/1984
JP 2002-511601 A 4/2002
(Continued)

OTHER PUBLICATIONS

International Search Report issued in PCT/JP2018/005284 dated Apr. 24, 2018.
(Continued)

*Primary Examiner* — Stephone B Allen
*Assistant Examiner* — Adam W Booher
(74) *Attorney, Agent, or Firm* — Edwards Neils LLC; Jean C. Edwards, Esq.

(57) ABSTRACT

An optical apparatus includes a beam splitter that transmits a part of an incidence ray and reflects another part of the incidence ray, a mirror member that includes a mirror surface arranged at a position at which light transmitted through the beam splitter is incident, and a retroreflective member that is arranged at a position at which light specularly reflected on the mirror surface, to be incident on the beam splitter and specularly reflected by the beam splitter is incident.

13 Claims, 14 Drawing Sheets

(51) Int. Cl.
*G02B 5/30* (2006.01)
*G02B 27/28* (2006.01)

(58) Field of Classification Search
CPC ........ G02B 5/3083; G02B 5/122; G02B 5/12; G02B 5/30; G02B 5/3025; G02B 27/283; G02B 27/10; G02B 27/14
See application file for complete search history.

(56) References Cited

U.S. PATENT DOCUMENTS

| | | | |
|---|---|---|---|
| 2005/0162664 A1* | 7/2005 | Hill | G01B 9/02027 356/508 |
| 2011/0181949 A1 | 7/2011 | Hashikawa | |
| 2012/0257169 A1* | 10/2012 | Liu | H04N 9/3167 353/20 |
| 2015/0248014 A1 | 9/2015 | Powell et al. | |
| 2017/0099480 A1 | 4/2017 | Kaneda et al. | |

FOREIGN PATENT DOCUMENTS

| | | |
|---|---|---|
| JP | 2012-128454 A | 7/2012 |
| JP | 2015-194601 A | 11/2015 |
| WO | 2016/199917 A1 | 12/2016 |

OTHER PUBLICATIONS

Written Opinion issued in PCT/JP2018/005284 dated Apr. 24, 2018.
International Preliminary Report on Patentability completed by WIPO dated Aug. 20, 2019 in connection with International Patent Application No. PCT/JP2018/005284.
Shusei Ito et al., Luminance Improvement of Aerial Double-Layered Display with Polarized AIRR, IDW/AD '16, 3DSAp2/3Dp2-11(2016), Japan.

* cited by examiner

OPTICAL APPARATUS FOR DISPLAYING AN IMAGE IN THE AIR

CROSS-REFERENCE TO RELATED APPLICATIONS

This application is a continuation application of International Application No. PCT/JP2018/005284, filed Feb. 15, 2018, which was published under Article 21(2) in Japanese, and which claims priority under 35 U.S.C. § 119(a) to Japanese Patent Application No. 2017-026213, filed Feb. 15, 2017. The above applications are hereby expressly incorporated by reference, in their entirety, into the present application.

BACKGROUND OF THE INVENTION

1. Field of the Invention

The present invention relates to an optical apparatus for implementing an aerial image display apparatus displaying an image in the air.

2. Description of the Related Art

In recent years, an aerial image display apparatus displaying an image in the air where a screen is not present has been suggested and is expected to be used as a sales promotion display having a high eye-catching effect or an input device enabling a touch operation on a video displayed in the air without touching a screen.

For example, in JP2012-128454A, an apparatus comprising a display unit and a structure in which minute mirror units are arranged in a matrix form is suggested. The apparatus displays an aerial video by reflecting light from the display unit twice.

In addition, in Shusei Ito and Hirotsugu Yamamoto, IDW/AD'16, 3DSAp2/3Dp2-11 (2016), an aerial image display apparatus comprising a liquid crystal display device, a beam splitter, and a retroreflective member is suggested. The aerial image display apparatus images a part of a light ray emitted from the liquid crystal display device in the air by specularly reflecting the part by the beam splitter and then, retroreflecting the part by the retroreflective member and transmitting the part through the beam splitter.

SUMMARY OF THE INVENTION

According to a review of the present inventors, it is found that the aerial image display apparatus disclosed in JP2012-128454A has an insufficient protrusion distance of the aerial image in the forward direction (direction away) from the mirror unit and has an insufficient eye-catching effect as a sales promotion display. In addition, while the aerial image can further protrude in the forward direction by installing the display unit away from the mirror, such a case poses a problem in that the size of the apparatus is increased. Furthermore, the aerial image display apparatus disclosed in JP2012-128454A has a narrow range in which an observer can visually recognize the aerial image. A position at which the whole aerial image can be visually recognized is limited to a narrow range.

Similarly, the aerial image display apparatus disclosed in Shusei Ito and Hirotsugu Yamamoto, IDW/AD'16, 3DSAp2/3Dp2-11 (2016) has an insufficient protrusion distance of the aerial image in the forward direction from the beam splitter. In order to increase the protrusion distance, the liquid crystal display device has to be installed away from the beam splitter, and a problem arises in that the size of the apparatus is increased. In addition, the aerial image display apparatus disclosed in Shusei Ito and Hirotsugu Yamamoto, IDW/AD'16, 3DSAp2/3Dp2-11 (2016) has a narrow range in which the observer can visually recognize the aerial image. The position at which the whole aerial image can be visually recognized is limited to a narrow range.

The present invention is conceived in view of the above matter. An object to be resolved by the present invention is to provide an optical apparatus that causes an aerial image to protrude in the forward direction and implements aerial image display having a wide visual recognition range of the aerial image without increasing the size of the apparatus.

An optical apparatus of the present invention is an optical apparatus comprising a beam splitter that transmits a part of an incidence ray and reflects another part of the incidence ray, a mirror member that includes a mirror surface arranged at a position at which light transmitted through the beam splitter is incident, and a retroreflective member that is arranged at a position at which light specularly reflected on the mirror surface, to be incident on the beam splitter and specularly reflected by the beam splitter, is incident.

The optical apparatus of the present invention may further comprise an installation unit at which an object to be projected is installed on an opposite side of the beam splitter from the mirror member. In this case, an image of the object to be projected that is installed at the installation unit is formed at a position that is optically conjugate with the object to be projected.

In the optical apparatus of the present invention, an image display unit, that displays an image as the object to be projected, may be installed at installation unit.

In the optical apparatus of the present invention, in a case where the image display unit is included, the image display unit may be an image display device emitting polarized light.

In the optical apparatus of the present invention, in a case where the image display unit is included, the image display unit may be a liquid crystal display device or an organic electro luminescence(EL) display device.

In the optical apparatus of the present invention, the beam splitter may include a polarization-selective reflective material.

In this case, the polarization-selective reflective material may be a reflective type polarizer.

In the optical apparatus of the present invention, in a case where the beam splitter includes the reflective type polarizer, it is preferable that the beam splitter further includes an absorptive type polarizer, directions of transmission axes of the reflective type polarizer and the absorptive type polarizer are the same, and the reflective type polarizer is installed closer to a mirror member side than the absorptive type polarizer is.

In the optical apparatus of the present invention, it is preferable that at least one surface of the beam splitter on which the light is incident is subjected to anti-reflective processing.

In the optical apparatus of the present invention, a polarization conversion element may be installed on the mirror surface of the mirror member.

In this case, it is preferable that the polarization conversion element is a ¼ wavelength retardation plate.

In the optical apparatus of the present invention, it is preferable that the retroreflective member is a retroreflective member in which multiple corner cube reflectors are arranged.

In the optical apparatus of the present invention, a polarization conversion element may be installed on a light incidence surface of the retroreflective member.

In this case, it is preferable that the polarization conversion element is a ¼ wavelength retardation plate.

According to the optical apparatus of the present invention, an aerial image display apparatus that can cause an aerial image to protrude in a forward direction and has a wide visual recognition range of the aerial image can be implemented without increasing the size of the apparatus.

The aerial image display apparatus implemented by the optical apparatus of the present invention can cause the aerial image to protrude in the forward direction from the beam splitter depending on the distance between the image display unit and the mirror surface by separating the image display unit from the mirror surface. At this point, since the image display unit is installed on the opposite side from the mirror surface and the retroreflective member with respect to the surface of the beam splitter, an increase in size of the apparatus is not accompanied. Furthermore, from the point of view of an observer, the aerial image can be visually recognized in not only the range of view of the retroreflective member but also the range of view of the mirror surface. Thus, the visual recognition range of the aerial image can be significantly increased, compared to that of an aerial image display apparatus in the related art.

DESCRIPTION OF THE PREFERRED EMBODIMENTS

Hereinafter, the present invention will be described in detail with reference to the drawings. While constituents disclosed below are described based on a representative embodiment and specific examples, the present invention is not limited to such an embodiment. In the present specification, a numerical range represented using "to" means a range including numerical values before and after "to" as a lower limit value and an upper limit value.

Optical Apparatus According to Embodiment of Present Invention

Figure 1:
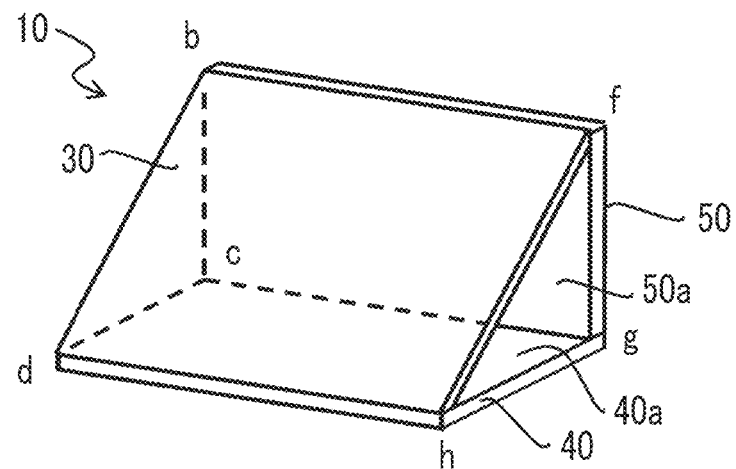
FIG. 1 is a schematic configuration of an optical apparatus according to an embodiment of the present invention.

FIG. 1 illustrates a perspective view of an optical apparatus 10 of a first embodiment of the present invention.

The optical apparatus 10 of the present embodiment comprises a beam splitter 30 transmitting a part of an incidence ray and reflecting another part of the incidence ray, a mirror member 40 having a mirror surface 40a arranged at a position of incidence of light transmitted through the beam splitter 30, and a retroreflective member 50 arranged at a position of incidence of light that is specularly reflected on the mirror surface 40a, incident on the beam splitter 30, and specularly reflected by the beam splitter 30. In the present embodiment, the arrangement is such that the mirror surface 40a is orthogonal to a light incidence surface 50a of the retroreflective member 50, and a surface (reflection and transmission surface) of the beam splitter 30 forms an angle of 45° with the mirror surface 40a and the light incidence surface 50a of the retroreflective member.

Figure 2:
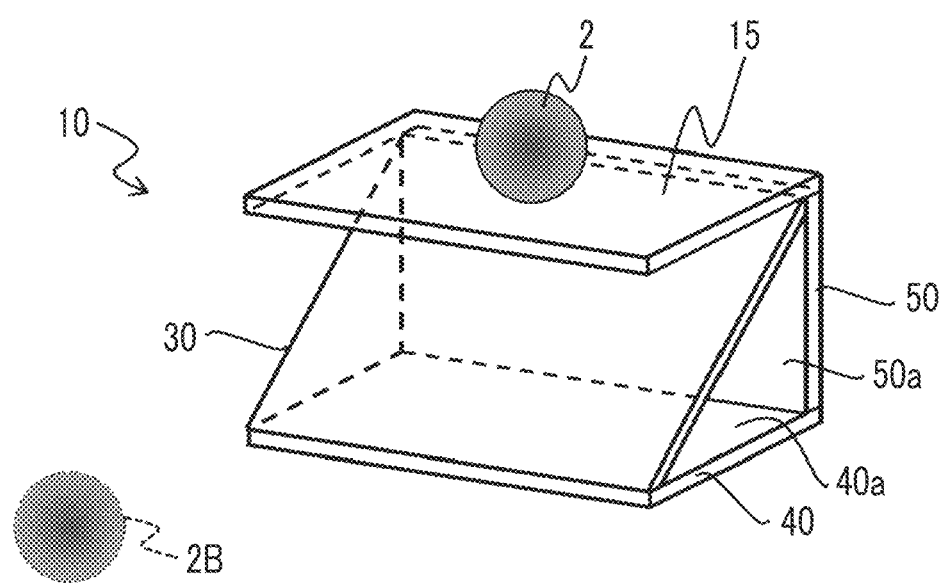
FIG. 2 is a descriptive diagram of the optical apparatus according to the embodiment of the present invention.

As illustrated in FIG. 2, the optical apparatus 10 may comprise an installation unit 15 for installing an object to be projected on the opposite side from the mirror member 40 with respect to the beam splitter 30. That is, the optical apparatus 10 may comprise an installation unit 15 for installing an object to be projected on the opposite side of the beam splitter 30 from the mirror member 40. In a case where an object to be projected 2 is installed on the installation unit 15, an image 2B of the object to be projected 2 is formed at a position optically conjugate with the object to be projected 2. The optically conjugate position is a conjugate position formed by an optical system configured by combining the beam splitter 30, the mirror surface 40a, and the retroreflective member 50.

As illustrated in FIG. 2, in a case where a sphere emitting light is installed on the installation unit 15 as the object to be projected 2, the image 2B of the light emitting sphere 2 is formed in the air protruding from the optical apparatus 10, and an observer sees the light emitting sphere as floating. The object to be projected arranged on the installation unit 15 is not limited to an object emitting light by itself and may be an object not emitting light by itself. In the case of an object to be projected not emitting light by itself, reflective light caused by reflection of extraneous light or illumination light on the surface of the object to be projected functions as light emitted from the object to be projected, and an image can be observed at the conjugate position.

The installation unit 15 may be comprised to be capable of supporting the object to be projected at a position conjugate with a position at which it is desirable to form the image of the object to be projected. In the present embodiment, for example, the installation unit 15 is a transparent plate made of resin or glass and comprised at a position facing the mirror surface with the beam splitter 30 interposed therebetween. It is preferable that the surface of the transparent plate disposed as the installation unit 15 is subjected to an anti-reflective process. The installation unit 15 may not be comprised in the optical apparatus 10.

The optical apparatus 10 can function as an aerial image display apparatus by comprising an image display unit displaying an image at a position conjugate with a position at which it is desirable to form an image in the optical apparatus 10.

Figure 3:
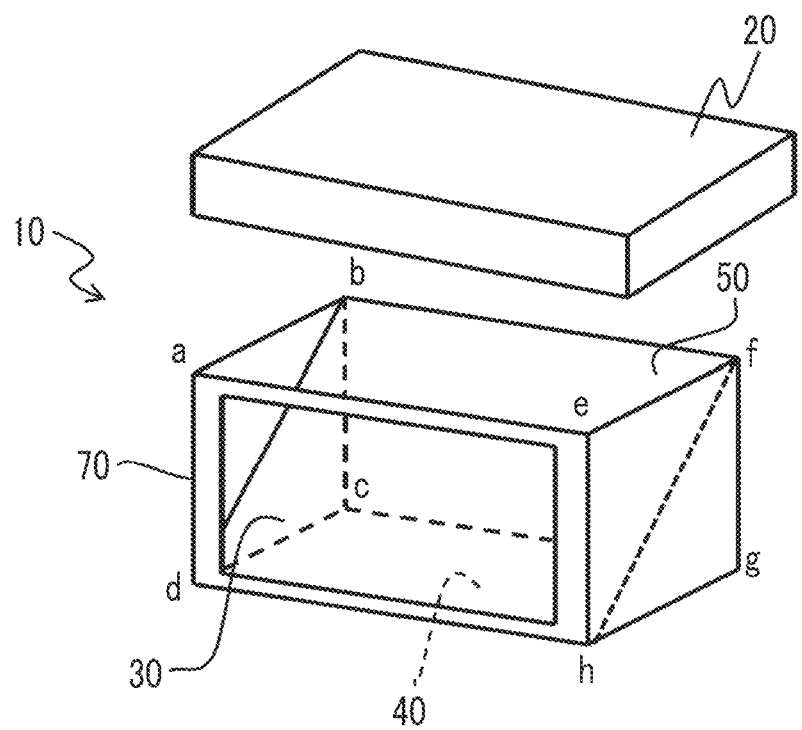
FIG. 3 is a perspective view of a casing in which the optical apparatus according to the embodiment of the present invention is included.

The handleability of the optical apparatus 10 can be improved by including the optical apparatus 10 inside a rectangular parallelepiped casing 70 of which a surface abfe is open as illustrated in FIG. 3. The mirror member 40 is arranged along a surface cghd inside the casing, and the retroreflective member 50 is arranged along a surface bfgc. In addition, the beam splitter 30 is arranged along a plane bfhd. In FIG. 3, each member is represented as a surface for convenience. In addition, a frame abfe of the open surface abfe is the installation unit 15. By installing an image display unit 20 of which an image display surface is directed to the inside of the casing on the frame abfe, an image displayed on the image display unit 20 is formed at a position protruding to the outside from a surface aehd of the casing 70.

A principle of forming an aerial image in a known aerial image display apparatus disclosed in Shusei Ito and Hirotsugu Yamamoto, IDW/AD'16, 3DSAp2/3Dp2-11 (2016) will be described. Next, a principle of the aerial image display apparatus implemented by the optical apparatus according to the embodiment of the present invention will be described in order to clearly show the differences therebetween.

Figure 23:
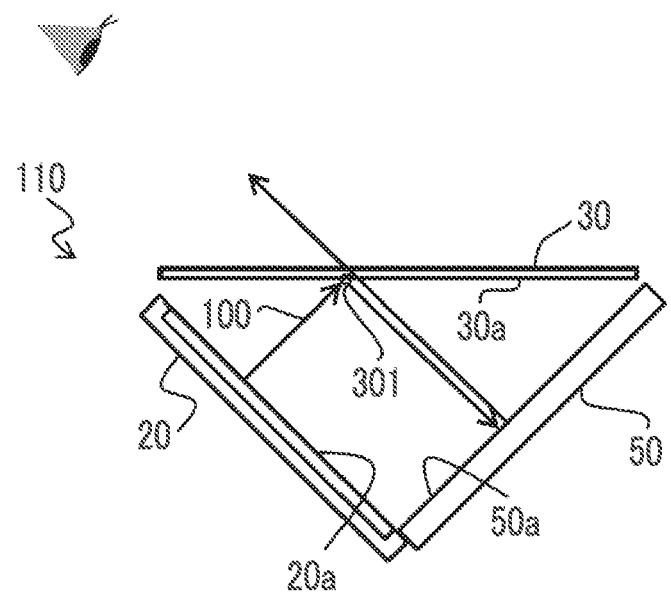
FIG. 23 is a schematic configuration of an aerial image display apparatus in the related art.

[Aerial Image Display Apparatus in Related Art] FIG. 23 illustrates a schematic configuration of an aerial image display apparatus 110 in the related art. The aerial image display apparatus 110 comprises the image display unit 20, the beam splitter 30, and the retroreflective member 50. The image display unit 20 and the retroreflective member 50 are installed on the same side as a reflection and transmission surface 30a of the beam splitter 30. A part 100 of a light ray emitted from the image display unit 20 is specularly reflected at a point 301 on the beam splitter 30 and is incident on the retroreflective member 50. Next, the part 100 is retroreflected in a direction opposite to the incidence direction by the retroreflective member 50 and is incident again at the point 301 on the beam splitter 30. A part of the part 100 is transmitted through the beam splitter 30.

Figure 24:
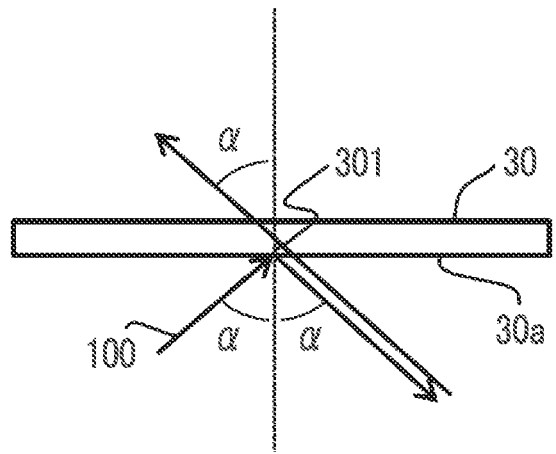
FIG. 24 is a descriptive diagram of the aerial image display apparatus in the related art.

FIG. 24 is an enlarged view around the point 301 on the beam splitter 30 in FIG. 23. In the first incident on the beam splitter 30, the incidence angle and the reflection angle are equal to an angle α. In addition, the light ray retroreflected by the retroreflective member 50 is incident again at the point 301 on the beam splitter 30 at the incidence angle α and is transmitted through the beam splitter 30 at the emission angle α.

Figure 25:
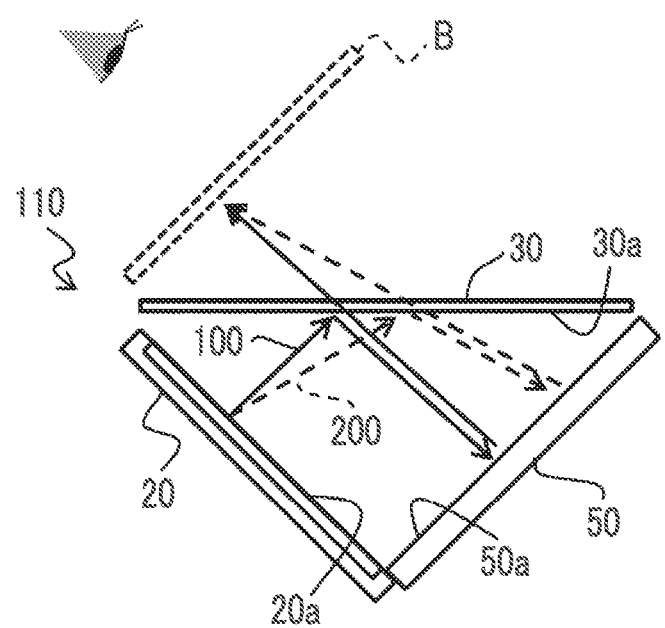
FIG. 25 is a schematic configuration of the aerial image display apparatus in the related art.

FIG. 25 illustrates the light ray 100 emitted from a point on the image display unit 20 and a light ray 200 emitted from the same point at a different angle in the aerial image display apparatus 110. As described above, for each of the light ray 100 and the light ray 200, the incidence angle in the first incidence on the beam splitter 30 is equal to the emission angle in the emission performed by retroreflecting the light ray by the retroreflective member 50 and then, causing the light ray to be incident at the same point on the beam splitter 30 again and transmitted through the beam splitter. Thus, the light ray 100 and the light ray 200 are imaged at a point in a space forming plane symmetry with the point of emission on the image display surface about the reflection and transmission surface 30a of the beam splitter 30. An aerial image B as the actual image is formed in the space forming plane symmetry with the image display surface 20a about the surface 30a of the beam splitter 30.

As is understood from FIG. 25, in the aerial image display apparatus 110, the aerial image B is displayed at a position forming plane symmetry with the image display surface 20a of the image display unit about the reflection and transmission surface 30a of the beam splitter 30. Thus, a protrusion distance from the reflection and transmission surface 30a of the beam splitter 30 is small. In addition, in the aerial image display apparatus 110, the observer visually recognizes the aerial image B in only the range of view of the whole retroreflective member 50.

Aerial Image Display Apparatus as One Embodiment of Optical Apparatus According to Embodiment of Present Invention Next, the reason that the protrusion distance of the aerial image can be increased in the aerial image display apparatus as an embodiment of the optical apparatus according to the embodiment of the present invention will be described.

Figure 4:
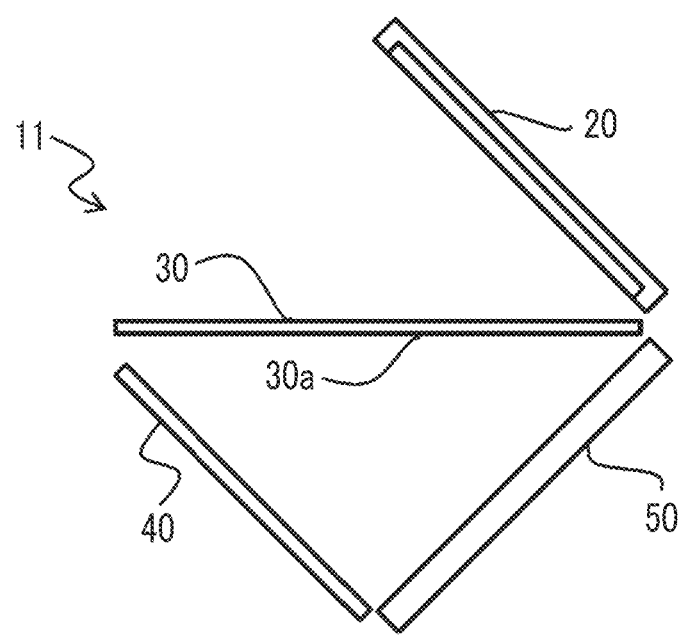
FIG. 4 is a schematic configuration representing a first aerial image display apparatus.

<First Aerial Image Display Apparatus>
FIG. 4 is a diagram illustrating a schematic configuration of a first aerial image display apparatus 11 as one embodiment of the optical apparatus according to the embodiment of the present invention. The aerial image display apparatus 11 comprises at least the image display unit 20, the beam splitter 30, the mirror member 40, and the retroreflective member 50. The mirror member 40 and the retroreflective member 50 are installed on the same side as the reflection and transmission surface 30a of the beam splitter 30. The image display unit 20 is installed on the opposite side from the mirror member 40 and the retroreflective member 50 with respect to the reflection and transmission surface 30a of the beam splitter 30.

Figure 5:
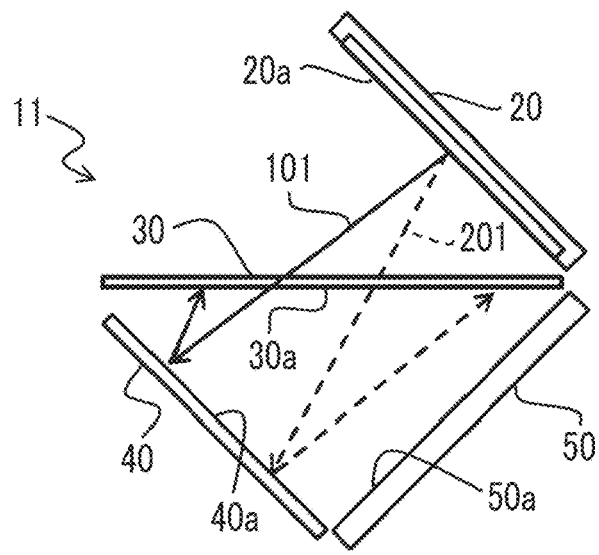
FIG. 5 is a diagram for describing an optical effect in the first aerial image display apparatus.
Figure 6:
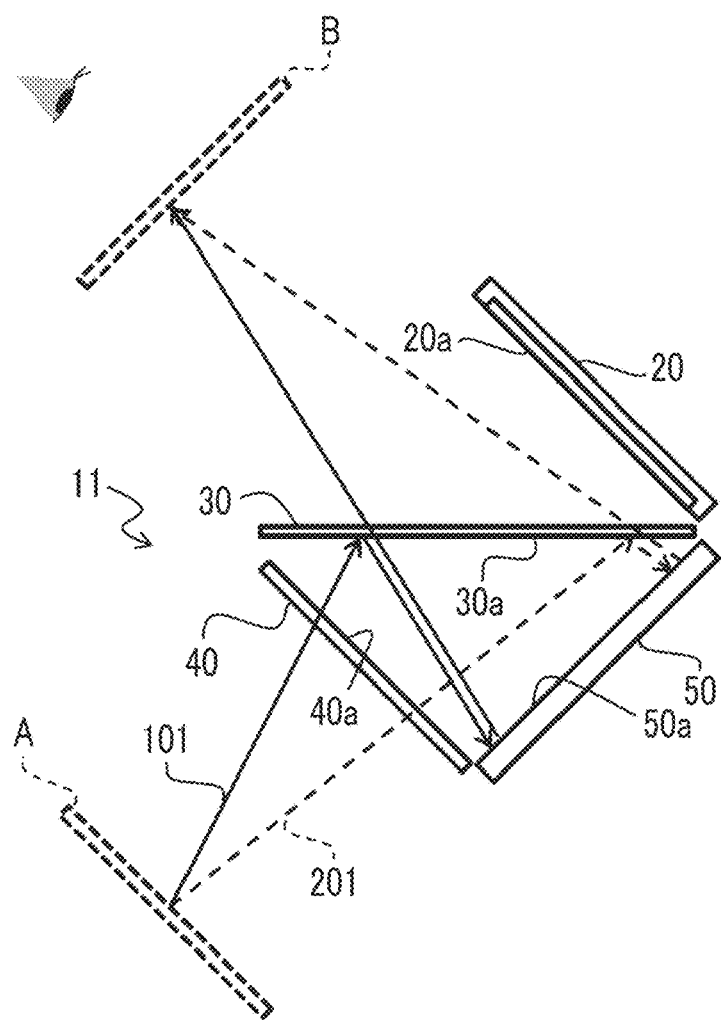
FIG. 6 is a diagram for describing the optical effect in the first aerial image display apparatus.

FIG. 5 illustrates a light ray 101 and a light ray 201 emitted at different angles from a point on the image display surface 20a of the image display unit 20 in the aerial image display apparatus 11. At least a part of each of the light ray 101 and the light ray 201 is transmitted through the beam splitter 30 and specularly reflected on the mirror surface 40a of the mirror member 40. At this point, as illustrated in FIG. 6, a virtual image A is formed at a position forming plane symmetry with the image display surface 20a of the image display unit 20 about the mirror surface 40a. The optical path of the light ray specularly reflected on the mirror surface 40a can be regarded as being the same as the optical path of the light ray emitted from the virtual image A. The subsequent optical path is similar to the optical path described using FIG. 25. That is, at least a part of light specularly reflected on the mirror surface 40a is reflected by the beam splitter 30 and incident on the retroreflective member 50. A part of light retroreflected by the retroreflective member 50 and incident on the beam splitter 30 is transmitted through the beam splitter 30 and is imaged at a point in the space forming plane symmetry with the point of emission of the light in the virtual image A about the reflection and transmission surface 30a of the beam splitter 30. That is, the point in the space is at a position optically conjugate with the point on the image display surface 20a. Accordingly, the aerial image display apparatus 11 can form an aerial image as an actual image B at a position forming plane symmetry with the virtual image A about the surface of the beam splitter 30.

Accordingly, the aerial image display apparatus 11 can cause the aerial image to protrude in the forward direction from the beam splitter 30. In addition, since the virtual image A is not present as the actual object, an increase in size of the apparatus is not accompanied.

Next, the reason that the visual recognition range (range in which the observer can visually recognize the aerial image) of the aerial image can be increased in the aerial image display apparatus 11 will be described.

Figure 7:
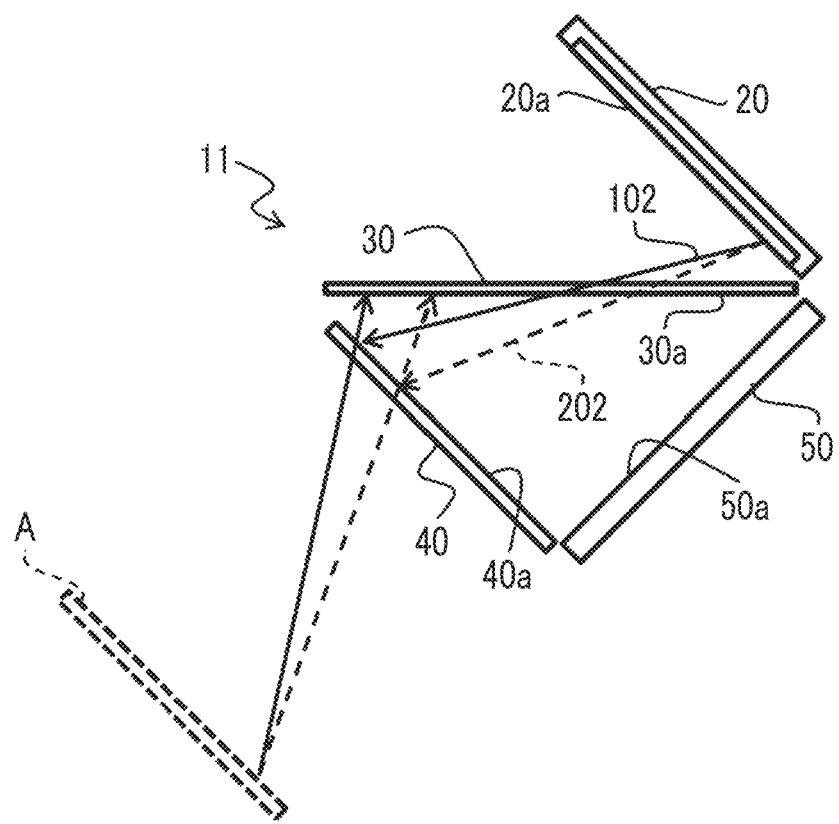
FIG. 7 is a diagram for describing the optical effect in the first aerial image display apparatus.

FIG. 7 illustrates a light ray 102 and a light ray 202 that are light rays different from those illustrated in FIG. 5 and are emitted from a point on the image display unit 20 in the aerial image display apparatus 11. At least a part of the light ray 102 and the light ray 202 is transmitted through the beam splitter 30 and is specularly reflected on the mirror surface 40a. At this point, the virtual image A is formed at a position forming plane symmetry with the image display unit 20 about the mirror surface 40a. Accordingly, the optical path of the light ray specularly reflected on the mirror surface 40a can be regarded as being the same as the optical path of the light ray emitted from the virtual image A.

Figure 8:
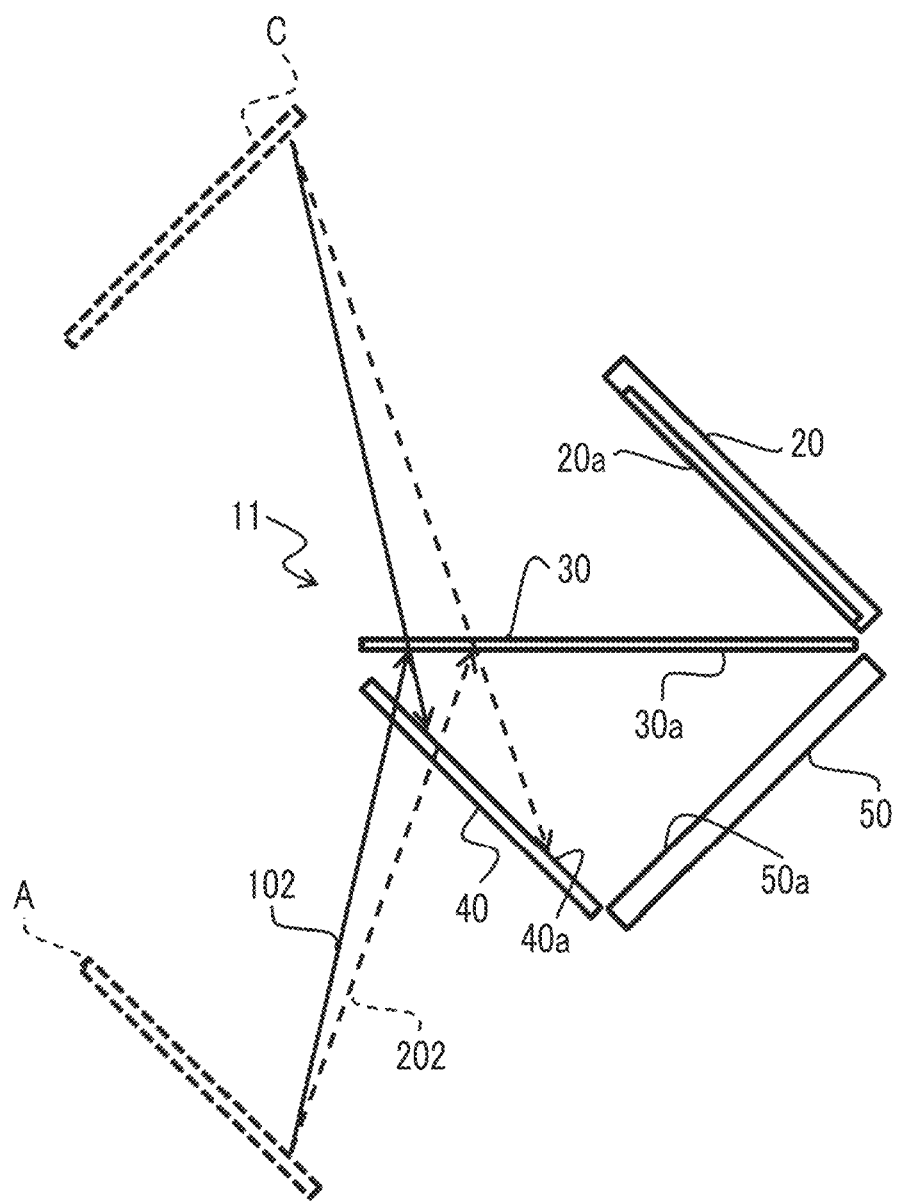
FIG. 8 is a diagram for describing the optical effect in the first aerial image display apparatus.

Next, as illustrated in FIG. 8, at least a part of the light ray 102 and the light ray 202 is specularly reflected by the beam splitter 30. At this point, a virtual image C is formed at a position forming plane symmetry with the virtual image A about the reflection and transmission surface 30a of the beam splitter 30. Accordingly, the optical path of the light ray specularly reflected by the beam splitter 30 can be regarded as being the same as the optical path of the light ray emitted from the virtual image C.

Figure 9:
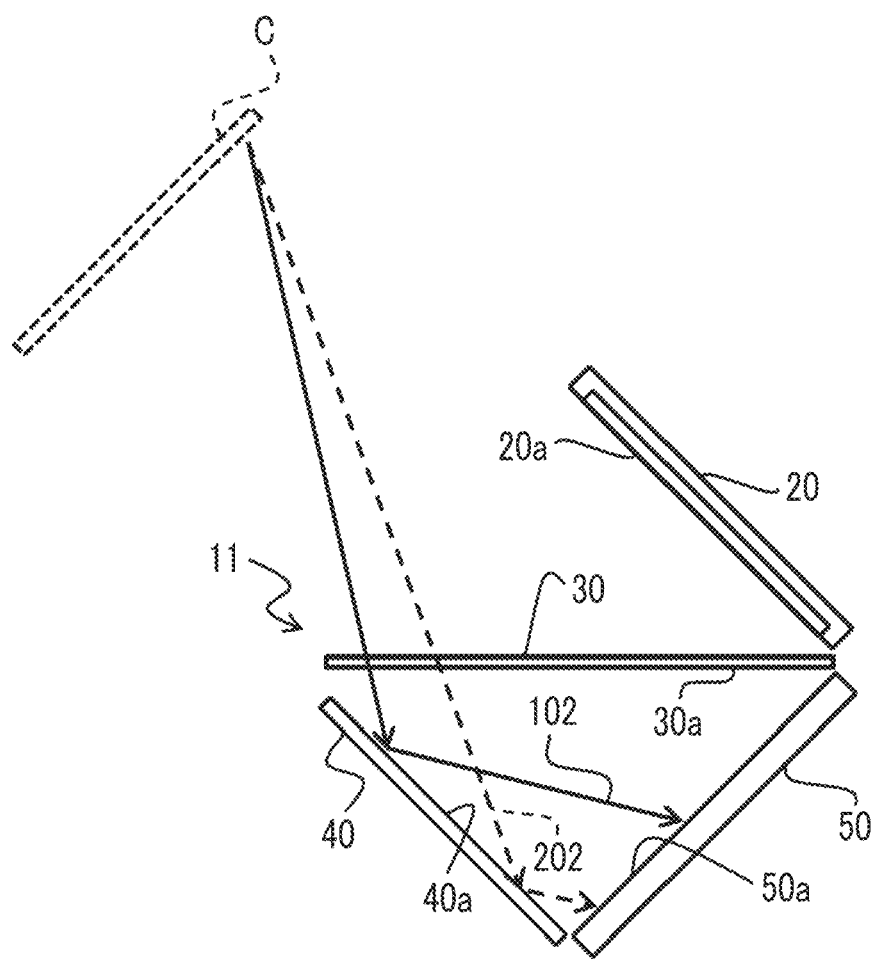
FIG. 9 is a diagram for describing the optical effect in the first aerial image display apparatus.

The light ray 102 and the light ray 202 specularly reflected by the beam splitter 30 are further specularly reflected on the mirror surface 40a and then, incident on the retroreflective member 50 as illustrated in FIG. 9.

Figure 10:
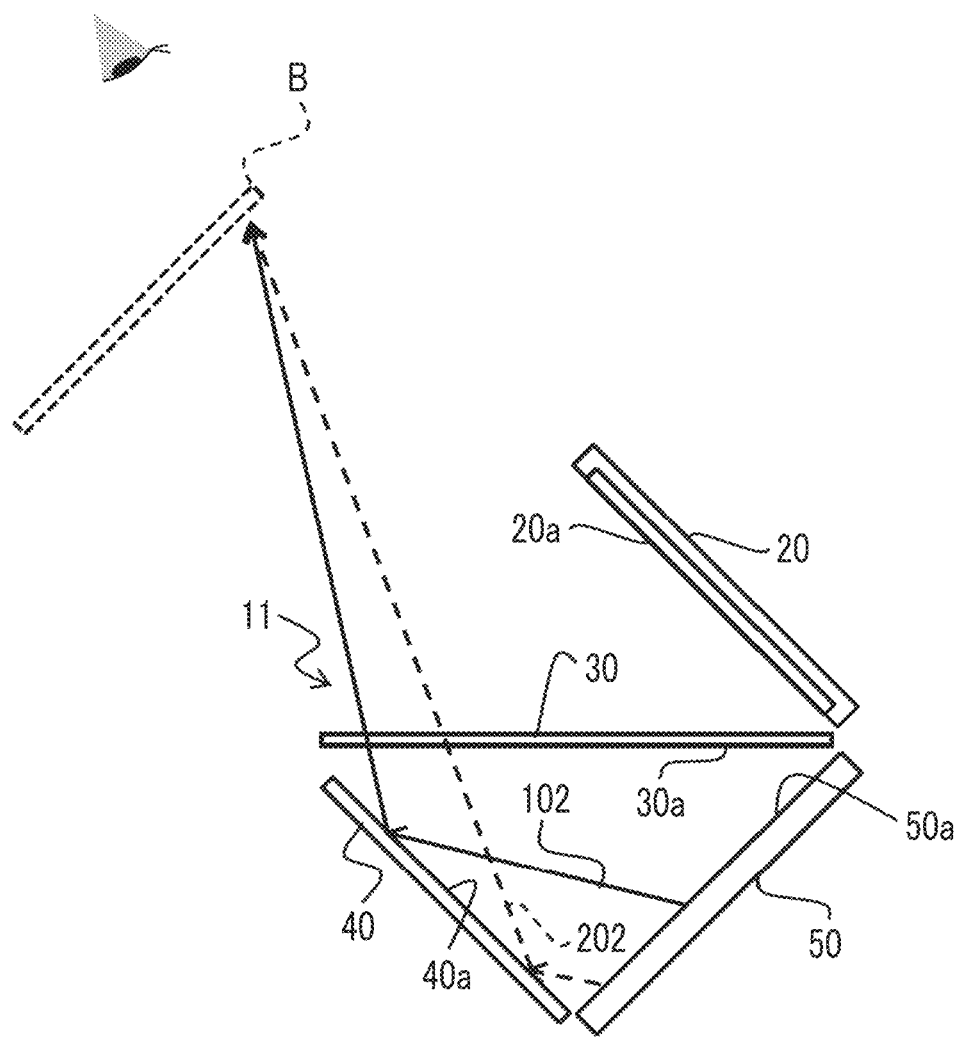
FIG. 10 is a diagram for describing the optical effect in the first aerial image display apparatus.

As illustrated in FIG. 10, the light ray 102 and the light ray 202 are retroreflected by the retroreflective member 50, follow the optical path illustrated in FIG. 9 in the reverse direction, and then, pass through the beam splitter 30 and are imaged at a point at the same position as the virtual image C. That is, the actual image B is formed at the same position as the virtual image C. At this point, the actual image B is completely the same as the actual image B illustrated in FIG. 6 in a view from the observer. Accordingly, the aerial image display apparatus 11 can cause the observer to visually recognize the aerial image B in not only the range of view of the retroreflective member 50 but also the range of view of the mirror surface 40a. The visual recognition range of the aerial image is wider than that of the apparatus in the related art.

[Beam Splitter]

The beam splitter used in the present aerial image display apparatus is an optical member that specularly reflects a part of the incidence ray and transmits light of the other part. In order to obtain the aerial image without distortion, it is preferable that the reflection and transmission surface of the beam splitter is a flat surface.

For example, the beam splitter may be a half mirror or a polarization-selective reflective element. The polarization-selective reflective element is an optical member that specularly reflects first polarized light and transmits second polarized light different from the first polarized light in the incidence ray. The reflected and transmitted polarized light may be linearly polarized light or circularly polarized light. Particularly, it is preferable that a reflective type polarizer selectively reflecting linearly polarized light is used as the polarization-selective reflective element. In the case of using the reflective type polarizer as the beam splitter, using an image display device emitting polarized light as the image display unit enables the beam splitter to be installed such that most of the light ray emitted from the image display device is transmitted through the beam splitter. The brightness of the aerial image can be improved, and stray light and a double image degrading the visibility of the aerial image can be reduced. A film obtained by stretching a layer including two types of polymers as disclosed in JP2011-053705A, a wire-grid polarizer, or the like can be used as the reflective type polarizer. A reflective type polarizer (product name APF) manufactured by 3M, a wire-grid polarizer (product name WGF) manufactured by Asahi Kasei Corporation, or the like can be preferably used as a commercially available product.

In addition, in the case of using the reflective type polarizer as the beam splitter, an absorptive type polarizer may be laminated on the surface of the beam splitter on the image display unit side such that the transmission axis of the absorptive type polarizer matches the transmission axis of the reflective type polarizer. By doing so, a part of extraneous light incident on the beam splitter from the image display unit side can be absorbed, and reflection of the extraneous degrading the visibility of the aerial image can be reduced.

In addition, it is preferable that the surface of the beam splitter on which light is incident is subjected to the anti-reflective process. The anti-reflective process may include laminating a thin layer having a specific refractive index and film thickness, bonding a moth eye film, and the like in order to reduce the reflectance of visible light. By performing the anti-reflective process, unnecessary reflection occurring on the surface of the beam splitter can be reduced. The brightness of the aerial image can be improved, and stray light and a double image degrading the visibility of the aerial image can be reduced.

[Mirror Surface]

The mirror surface of the mirror member is preferably a flat surface on which the incidence ray is specularly reflected. A general flat mirror can be used as the mirror member. In addition, the mirror surface is preferably installed at an angle of 10° to 90°, more preferably installed at an angle of 40° to 90°, still more preferably installed at an angle of 40° to 50°, and most preferably installed at an angle of 45° with respect to the reflection and transmission surface of the beam splitter. The angle with respect to the reflection and transmission surface of the beam splitter preferably falls in the above range because the protrusion distance of the aerial image can be increased, and the visual recognition range of the aerial image can be increased.

[Retroreflective Member]

The retroreflective member is a reflective member that inverts the incidence ray in the incidence direction. In order to obtain the aerial image without distortion, it is preferable that the retroreflective member is a member having a sheet shape or a flat plate shape. A sheet covered with transparent spheres such as glass beads, a sheet covered with a corner cube structure, or the like is known as a retroreflective member exhibiting the above function. It is preferable that a corner cube array sheet in which multiple corner cube reflectors are arranged is used as a regular reflective member from the viewpoint of increasing the resolution of the aerial image. A retroreflective sheet (product name Nikkalite) manufactured by Nippon Carbide Industries Co., Inc or the like can be preferably used as the corner cube array sheet.

The retroreflective member is preferably installed at an angle of 10° to 90°, more preferably installed at an angle of 40° to 90°, still more preferably installed at an angle of 40° to 50°, and most preferably installed at an angle of 45° with respect to the surface of the beam splitter on the same side of the beam splitter as the mirror member. The angle with respect to the surface of the beam splitter preferably falls in the above range because the protrusion distance of the aerial image can be increased, and the visually recognizable range of the aerial image can be increased.

In addition, a plurality of retroreflective members may be installed on the same side of the beam splitter as the mirror member. It is preferable that the beam splitter, the mirror member, and the retroreflective members are installed such that a closed space is formed by the beam splitter, the mirror surface, and the surfaces of the plurality of retroreflective members. Such a case is preferable because the brightness of the aerial image can be improved.

[Image Display Unit]

The image display unit is installed on the opposite side from the mirror member and the retroreflective member with respect to the beam splitter. In addition, it is preferable that the image display unit is installed to face the mirror surface.

The image display surface of the image display unit may be a flat surface or a curved surface. In a case where the image display surface is a curved surface, the aerial image is also curved, and an ability to provide a solid view of the image and an eye-catching effect can be increased.

In addition, in a case where the image display surface is a flat surface, it is preferable that the image display surface and the mirror surface are installed in parallel. In this case, it is possible that the aerial image does not have distortion.

The image display unit may be a still picture or a photograph or may be an image display device. A liquid crystal display device, an organic EL display device, or the like can be preferably used as the image display device. In addition, the solid view of the aerial image can be enabled using a solid image display device of a light field type, a parallax barrier type, or the like as the image display device.

In addition, it is preferable that an image display device emitting polarized light is used as the image display device. Such a case is preferable because by combining the image display device with the beam splitter selectively reflecting polarized light, the image display device can be installed such that most of the light ray emitted from the image display device is transmitted through the beam splitter. The brightness of the aerial image can be improved, and stray light and a double image degrading the visibility of the aerial image can be reduced. A liquid crystal display device or an organic EL display device in which emission light is linearly polarized light is present and can be preferably used.

Furthermore, it is preferable that the image display device is installed such that the emitted polarized light is linearly polarized light and is incident as p-polarized light on the beam splitter. A case where light incident on the beam splitter is p-polarized light is preferable because unnecessary specular reflection on the surface of the beam splitter can be reduced, and a double image degrading the visibility of the aerial image can be reduced. The p-polarized light means linearly polarized light in which the vibration direction of an electric field is a direction perpendicular to the incidence surface of light.

[Polarization Conversion Element]

It is preferable that a polarization conversion element is installed on the surfaces of the mirror member and the retroreflective member. A depolarization element or a retardation plate can be used as the polarization conversion element.

In the case of using a polarization-selective reflective material in the beam splitter, the light ray emitted from the image display unit and transmitted through the beam splitter is polarized. Next, when the light ray is reflected on the mirror surface, the presence of the polarization conversion element on the surface of the mirror surface can convert a polarization state of the light ray into a partially different polarization state. Accordingly, when the light ray is incident on the beam splitter again, the reflectance on the beam splitter can be increased.

In addition, in a case where the light ray incident on the retroreflective member is polarized, the presence of the polarization conversion element on the surface of the retroreflective member can convert the polarization state of the light ray into a partially different polarization state. When the light ray is incident on the beam splitter again, the transmittance on the beam splitter can be increased.

It is preferable that a ¼ wavelength retardation plate is used as the polarization conversion element installed on the surface of the mirror surface. In addition, in a case where the light ray incident on the mirror surface is linearly polarized light, the polarization conversion element is installed such that the angle formed between a projection of a polarization axis to the mirror surface and a slow axis of the ¼ wavelength retardation plate is approximately 45°. In such a configuration, the light ray passes through the ¼ wavelength retardation plate twice in the reflection on the mirror surface. When the light ray is incident on the beam splitter again, the polarization axis is rotated by approximately 90°. Accordingly, the reflectance in the beam splitter can be approximated to 100%, and the brightness of the aerial image can be improved.

Similarly, it is preferable that the ¼ wavelength retardation plate is also used as the polarization conversion element installed on the surface of the retroreflective member. In addition, in a case where the light ray incident on the retroreflective member is linearly polarized light, the polarization conversion element is installed such that the angle formed between a projection of the polarization axis to the retroreflective member and the slow axis of the ¼ wavelength retardation plate is approximately 45°.

The ¼ wavelength retardation plate may have a phase difference of ¼ of any wavelength in the visible range. For example, a retardation plate having a phase difference of approximately 138 nm in a wavelength of 550 nm can be preferably used. In addition, in order to reduce color unevenness of the aerial image, it is preferable that the ¼ wavelength retardation plate has a negative dispersibility with respect to the wavelength. Having a negative dispersibility with respect to the wavelength means that the value of the phase difference in the wavelength is increased as the wavelength is increased.

The polarization conversion element may be installed on the surface (surface on which light is incident) of the beam splitter on the same side as the mirror member and the retroreflective member. Even in this case, it is preferable to use the ¼ wavelength retardation plate. In addition, it is preferable that the angle formed between the polarization axis of the polarized light incident on the beam splitter and the slow axis of the ¼ wavelength retardation plate is approximately 45°. Even in this case, the reflectance and the transmittance on the beam splitter can be increased, and the brightness of the aerial image can be improved.

[Second Aerial Image Display Apparatus]

A second aerial image display apparatus as one embodiment of the optical apparatus according to the embodiment of the present invention will be described.

Figure 11:
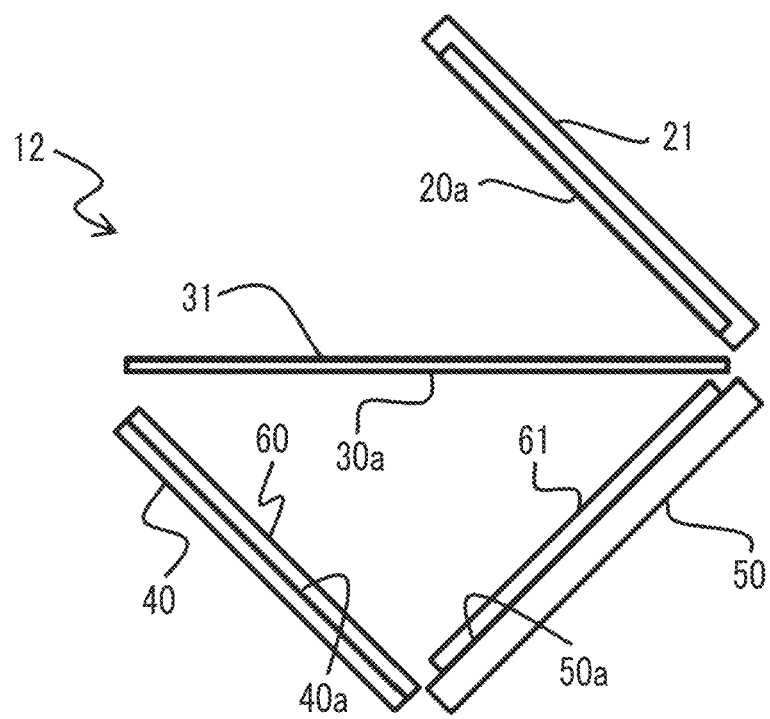
FIG. 11 is a schematic configuration representing a second aerial image display apparatus.

FIG. 11 is a schematic configuration diagram of the second aerial image display apparatus. An aerial image display apparatus 12 comprises an image display unit 21, a beam splitter 31, the mirror member 40, the retroreflective member 50, and ¼ wavelength retardation plates 60 and 61 as the polarization conversion element. The arrangement of the image display unit 21, the beam splitter 31, the mirror member 40, and the retroreflective member 50 is the same as the first aerial image display apparatus 11. The optical path of the light ray is also the same. In the present aerial image display apparatus 12, the ¼ wavelength retardation plate 60 is comprised on the mirror surface 40a of the mirror member 40, and the ¼ wavelength retardation plate 61 is comprised on the light incidence surface 50a of the retroreflective member 50.

Figure 12:
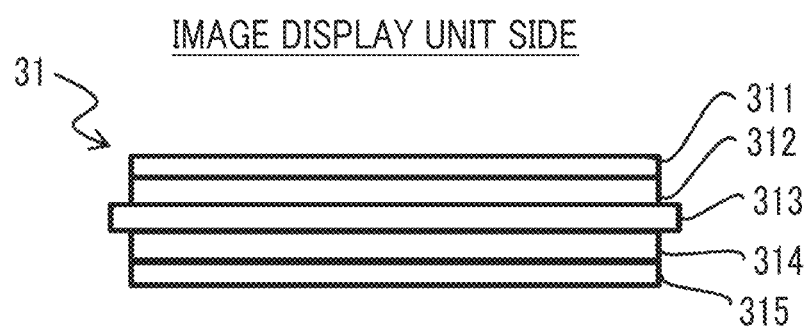
FIG. 12 is a detailed diagram of a beam splitter of the second aerial image display apparatus.

FIG. 12 is a detailed diagram illustrating a configuration of the beam splitter 31 comprised in the aerial image display apparatus 12. In the beam splitter 31, an anti-reflective film 311, an absorptive type polarizer 312, a glass substrate 313, a reflective type polarizer 314, and an anti-reflective film 315 are laminated in this order from the surface of the beam splitter 31 on the image display unit 21 side. The transmission axis of the absorptive type polarizer 312 is parallel to the transmission axis of the reflective type polarizer 314.

Figure 13:
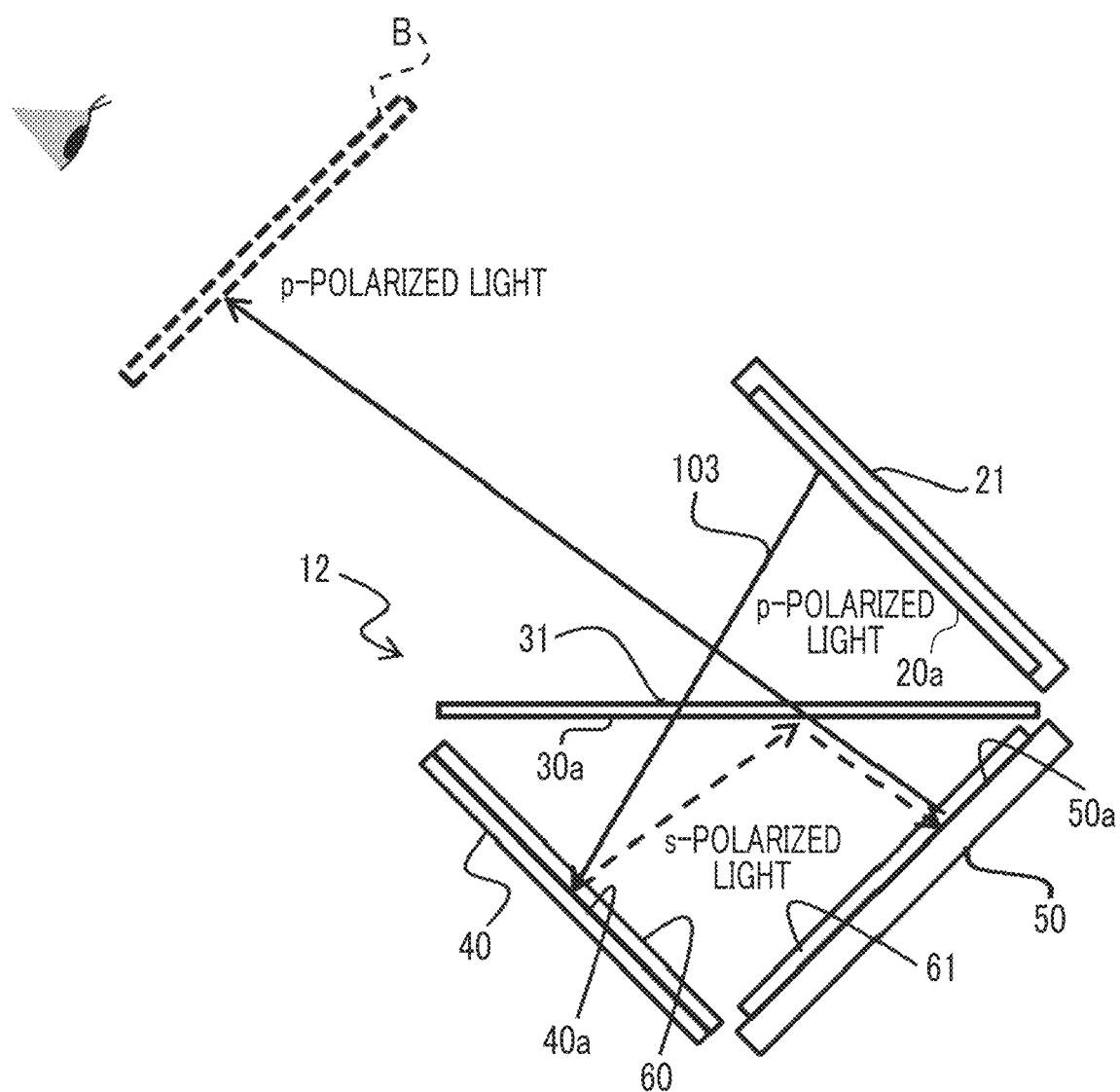
FIG. 13 is a diagram for describing an optical effect in the second aerial image display apparatus.

FIG. 13 illustrates the optical path of a light ray 103 emitted from a point on the image display surface 20a of the image display unit 21 in the aerial image display apparatus 12. The light ray 103 is p-polarized light when the light ray 103 is emitted from the image display unit 21. In FIG. 13, an optical path illustrated by a solid line indicates that the light ray is p-polarized light, and an optical path illustrated by a broken line indicates that the light ray is s-polarized light.

The beam splitter 31 is installed in a direction in which the absorptive type polarizer 312 and the reflective type polarizer 314 transmit the p-polarized light. Accordingly, most of the light ray 103 is transmitted through the beam splitter 31 and is incident on the mirror surface 40a through the ¼ wavelength retardation plate 60. In addition, by installing the anti-reflective films 311 and 315 on the surface of the beam splitter 31 on which light is incident, reflection on the surface of the beam splitter 31 is reduced, and the occurrence of stray light and a double image is reduced. In addition, by causing the light ray 103 to be incident on the beam splitter 31 as the p-polarized light, reflection on the surface of the beam splitter 31 is further reduced.

In the reflection on the mirror surface 40a in the mirror member 40, the polarization state of the light ray 103 is converted into s-polarized light by passing through the ¼ wavelength retardation plate 60 twice. The ¼ wavelength retardation plate 60 is installed such that the angle formed between the slow axis of the ¼ wavelength retardation plate 60 and a projection of the polarization axis of the light ray 103 to the mirror surface 40a is approximately 45°.

Next, the light ray 103 is incident on the beam splitter 31 again. However, since the reflective type polarizer 314 is in a direction reflecting the s-polarized light, most of the light ray 103 is specularly reflected and is incident on the retroreflective member 50 through the ¼ wavelength retardation plate 61.

In the reflection on the retroreflective member 50, the polarization state of the light ray 103 is converted into p-polarized light by passing through the ¼ wavelength retardation plate 61 twice. The ¼ wavelength retardation plate 61 is installed such that the angle formed between the slow axis of the ¼ wavelength retardation plate 61 and a projection of the polarization axis of the light ray 103 to the retroreflective member 50 is approximately 45°.

The light ray 103 retroreflected by the retroreflective member 50 is incident on the beam splitter 31 for the third time. At this point, the polarization state of the light ray 103 is the p-polarized light. Thus, most of the light ray 103 is transmitted through the beam splitter 31.

The light ray 103 reaches the point of view of the observer while unnecessary reflection and transmission in the middle of the optical path are reduced. In a case where other light rays emitted from the image display unit 21 are considered, it is understood that the aerial image B as the actual image B protruding in the forward direction from the beam splitter 31 is formed based on the same principle as described using FIG. 5 and FIG. 6.

In addition, since unnecessary reflection and transmission of the light rays are reduced in the middle of the optical path, the aerial image having a high brightness with reduced stray light and a double image can be obtained. Furthermore, from the point of view of the observer, the aerial image can be visually recognized in not only the range of view of the retroreflective member 50 but also the range of view of the mirror surface 40a. Thus, the aerial image has a wide visual recognition range.

While the aerial image display apparatus as the embodiment of the optical apparatus according to the embodiment of the present invention is described above, the image can be displayed not only in the air but also in a liquid such as water using the optical apparatus according to the embodiment of the present invention.

EXAMPLE

The features of the present invention will be further specifically described with examples described below. Materials, the amount of use, ratios, processing contents, processing procedures, and the like illustrated below can be appropriately changed without departing from the gist of the present invention. In addition, configurations other than the configurations illustrated below can be used without departing from the gist of the present invention.

[Manufacturing of Casing of Aerial Image Display Apparatus]

Figure 14:
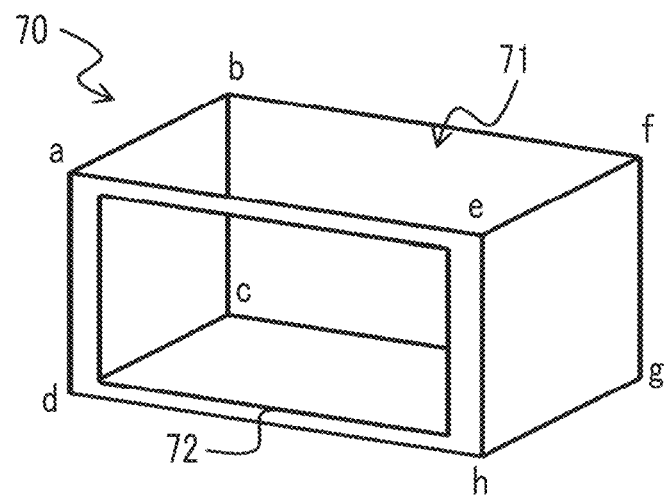
FIG. 14 is a descriptive diagram of a casing of an aerial image display apparatus of an example and a comparative example.

The casing 70 of a rectangular parallelepiped shape illustrated in FIG. 14 is manufactured by processing a black acrylic plate (thickness of 1 mm). In the bottom surface cghd of the casing 70, the length of the long side is 16 cm, and the length of the short side is 9 cm. In addition, the height of the casing 70 is 9 cm. The upper surface abfe of the casing 70 is an opening portion 71 in which the acrylic plate is not present. In addition, the inner side of the side surface aehd at 1 cm from each side is cut, and an opening portion 72 is disposed.

[Manufacturing of Beam Splitter]

(Beam Splitter 32)

Figure 15:
FIG. 15 is a detailed diagram of a beam splitter 32.

A dielectric multilayer film half mirror (product name H216 obtained from Shibuya Optical Co., Ltd) 310 having a transmittance of 50% and a reflectance of 50% is processed to have a long side of 15.2 cm and a short side of 12 cm and is prepared as the beam splitter 32 (refer to FIG. 15).

(Polarization Beam Splitter 33)

Figure 16:
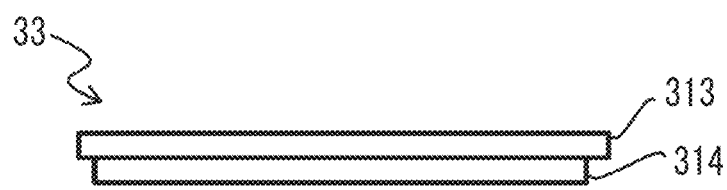
FIG. 16 is a detailed diagram of a beam splitter 33.

A polarization beam splitter 33 illustrated in FIG. 16 is manufactured by bonding a wire-grid polarization film (product name WGF manufactured by Asahi Kasei Corporation) as the reflective type polarizer 314 (hereinafter, referred to as the wire-grid polarization film 314) to a single surface of the glass substrate 313 having a long side of 16 cm, a short side of 12 cm, and a thickness of 1 mm such that the transmission axis of the wire-grid polarization film 314 is equal to the short side direction of the glass substrate 313.

(Anti-Reflective Polarization Beam Splitter 34)

Figure 17:
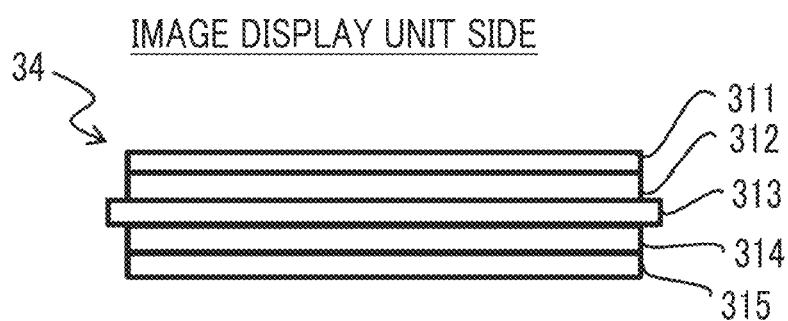
FIG. 17 is a detailed diagram of a beam splitter 34.

In the same manner as the polarization beam splitter 33, the wire-grid polarization film 314 is bonded to a single surface of the glass substrate 313. Furthermore, an absorptive type polarization film as the absorptive type polarizer 312 (hereinafter, referred to as the absorptive type polarization film 312) is bonded to the surface of the glass substrate 313 on the opposite side with respect to the wire-grid polarization film 314 such that the direction of the transmission axis of the absorptive type polarization film 312 is equal to the direction of the transmission axis of the wire-grid polarization film 314. Furthermore, the anti-reflective films 311 and 315 (hereinafter, referred to as the moth eye film 311 and the moth eye film 315) configured with moth eye films manufactured in accordance with the film No. 15 of Example 2 in JP2017-016065A are bonded to the surfaces of the absorptive type polarization film 312 and the wire-grid polarization film 314. Accordingly, an anti-reflective polarization beam splitter 34 illustrated in FIG. 17 is manufactured.

(Anti-Reflective Circular Polarization Beam Splitter 35)

Figure 18:
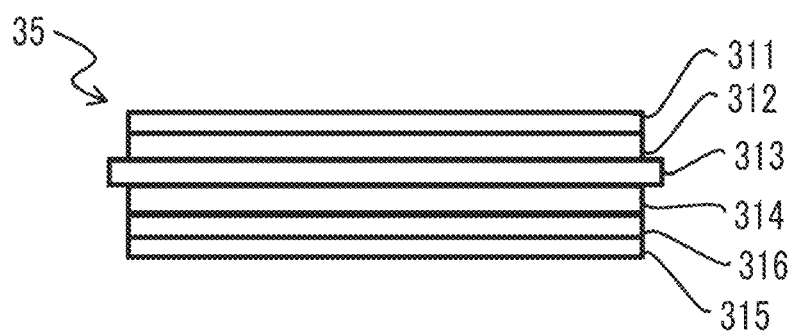
FIG. 18 is a detailed diagram of a beam splitter 35.

In the manufacturing of the anti-reflective polarization beam splitter 34, before the moth eye film 315 is bonded to the surface of the wire-grid polarization film 314, a polycarbonate ¼ wavelength retardation film having a negative dispersibility (product name Pure Ace WR W-142 manufactured by Teijin Limited) as the polarization conversion element 316 (hereinafter, referred to as the retardation film 316) is bonded such that the angle formed between the direction of the slow axis of the retardation film 316 and the direction of the transmission axis of the wire-grid polarization film 314 is 45°. Then, the moth eye film 315 is bonded to the surface of the retardation film 316. Accordingly, an anti-reflective circular polarization beam splitter 35 illustrated in FIG. 18 is manufactured.

Example 1

Figure 19:
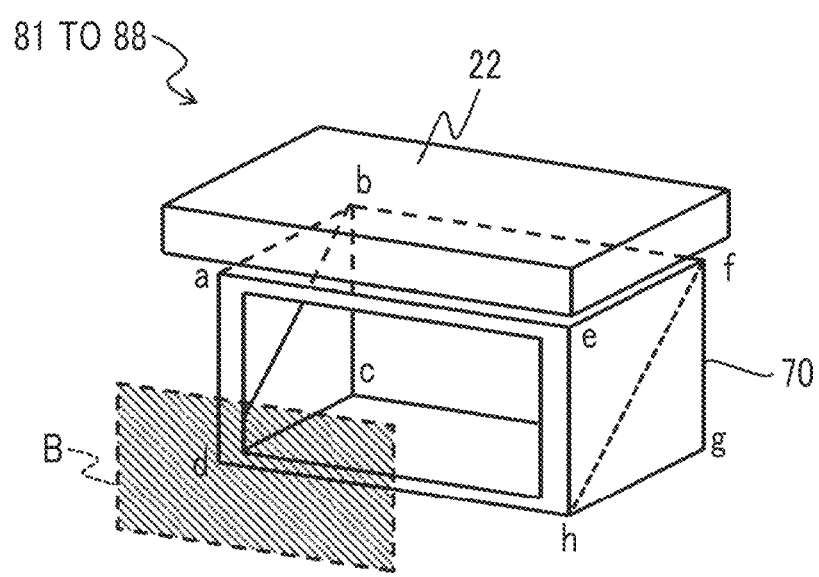
FIG. 19 is a descriptive diagram of an aerial image display apparatus of Examples 1 to 8.

FIG. 19 illustrates a positional relationship among the image display unit 22, the casing 70, and the aerial image B in aerial image display apparatuses 81 to 88 of Examples 1 to 8.

A bead type retroreflective sheet (product name Scotchlite manufactured by 3M) is bonded to the inner side of the side surface bfgc of the casing 70, and a flat mirror is bonded to the inner side of the bottom surface cghd. In addition, the beam splitter 32 is installed at the position of the plane bfhd.

Furthermore, iPhone (registered trademark) 6s Plus that is a smartphone manufactured by Apple is installed on the upper surface abfe as the image display unit 22. The frame abfe surrounding the open upper surface abfe of the casing 70 corresponds to the installation unit on which the object to be projected is installed. In iPhone (registered trademark) 6s Plus, the emission light is elliptically polarized light and is not linearly polarized light.

Accordingly, the aerial image display apparatus 81 of Example 1 is manufactured. While the image display unit 22 and the frame abfe of the casing 70 are illustrated as being separated from each other in FIG. 19, the image display unit 22 is placed in contact with the frame abfe in Example 1 to Example 8.

Example 2

In the aerial image display apparatus 81 of Example 1, a corner cube array type retroreflective sheet (product name Nikkalite manufactured by Nippon Carbide Industries Co., Inc) is bonded to the inner side of the side surface bfgc of the casing 70 instead of Scotchlite described above.

Accordingly, the aerial image display apparatus 82 of Example 2 is manufactured (refer to FIG. 19).

Example 3

In the aerial image display apparatus 82 of Example 2, the retroreflective sheets Nikkalite are bonded to the inner side of a side surface abcd and the inner side of a side surface efgh such that the retroreflective sheets Nikkalite overlap with a triangle bcd and a triangle fgh.

Accordingly, the aerial image display apparatus 83 of Example 3 is manufactured (refer to FIG. 19).

Example 4

In the aerial image display apparatus 83 of Example 3, a polycarbonate ¼ wavelength retardation film having a negative dispersibility (product name Pure Ace WR W-142 manufactured by Teijin Limited) is bonded to the surfaces of the retroreflective sheets bonded to the inner sides of the side surface bfgc, the side surface abcd, and the side surface efgh such that the angle formed between the slow axis of the polycarbonate ¼ wavelength retardation film and the bottom surface of the casing 70 is 45°.

In addition, the polycarbonate ¼ wavelength retardation film having a negative dispersibility is also bonded to the surface of the flat mirror bonded to the inner side of the bottom surface cghd such that the angle formed between the slow axis of the polycarbonate ¼ wavelength retardation film and a side of the bottom surface is 45°.

Furthermore, the polarization beam splitter 33 is installed instead of the beam splitter 32. Accordingly, the aerial image display apparatus 84 of Example 4 is manufactured (refer to FIG. 19).

Example 5

In the aerial image display apparatus 84 of Example 4, the image display unit 22 is replaced with Kindle Fire HDX that is a tablet terminal manufactured by Amazon. Light emitted from Kindle Fire HDX is linearly polarized light. Kindle Fire HDX is installed such that the polarization axis of Kindle Fire HDX causes p-polarized light to be incident on the polarization beam splitter 33.

Accordingly, the aerial image display apparatus 85 of Example 5 is manufactured (refer to FIG. 19).

Example 6

In the aerial image display apparatus 85 of Example 5, the anti-reflective polarization beam splitter 34 is installed instead of the polarization beam splitter 33 such that the absorptive type polarization film 312 is on the image display unit 22 side, and the wire-grid polarization film 314 is on the flat mirror side.

Accordingly, the aerial image display apparatus 86 of Example 6 is manufactured (refer to FIG. 19).

Example 7

In the aerial image display apparatus 83 of Example 3, the anti-reflective circular polarization beam splitter 35 is installed instead of the beam splitter 32 such that the absorptive type polarization film 312 is on the image display unit 22 side, and the wire-grid polarization film 314 is on the flat mirror side.

In addition, the image display unit 22 is replaced with Kindle Fire HDX which is a tablet terminal manufactured by Amazon. In Kindle Fire HDX, the emission light is linearly polarized light.

Accordingly, the aerial image display apparatus 87 of Example 7 is manufactured (refer to FIG. 19).

Example 8

In the aerial image display apparatus 86 of Example 6, the image display unit 22 is replaced with FinePix REAL 3D V1 that is a digital photo frame manufactured by Fujifilm Corporation and is a solid image display device enabling a solid view of an image with the naked eye. The emission light from the image display device is linearly polarized light.

Accordingly, the aerial image display apparatus 88 of Example 8 is manufactured (refer to FIG. 19).

Example 9

In the aerial image display apparatus 86 of Example 6, the tablet terminal Kindle Fire HDX is installed at a position of 10 cm above the upper surface abfe of the casing 70 as the image display unit 22.

Figure 20:
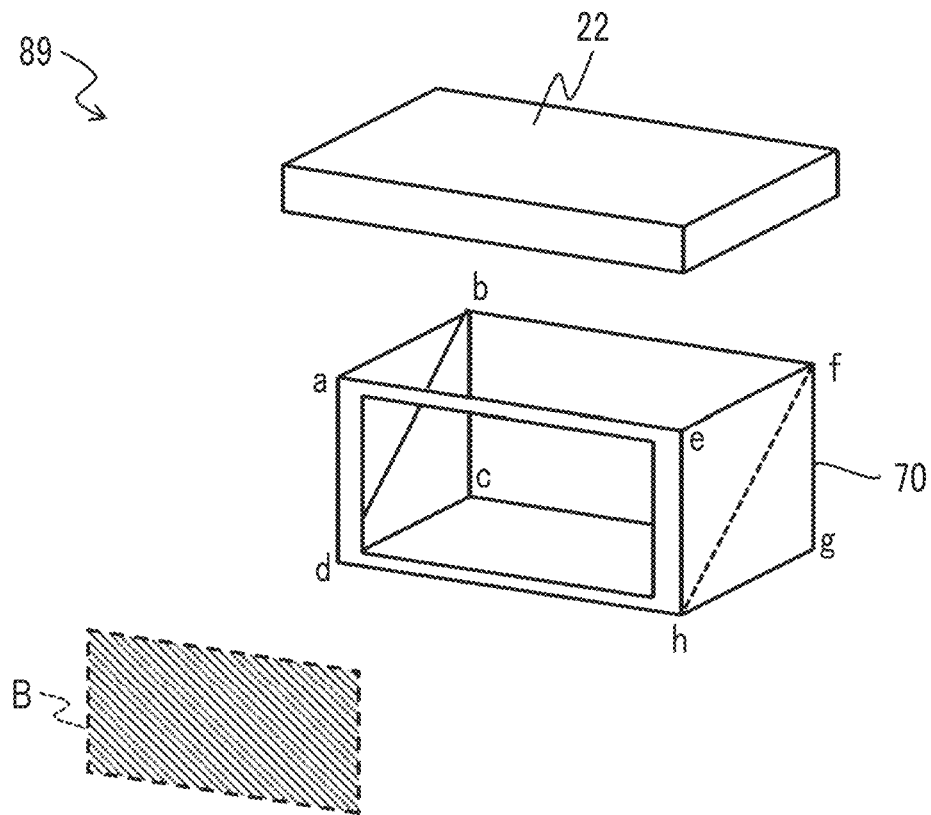
FIG. 20 is a descriptive diagram of an aerial image display apparatus of Example 9.

Accordingly, the aerial image display apparatus 89 of Example 9 is manufactured (refer to FIG. 20).

Comparative Example 1

Figure 21:
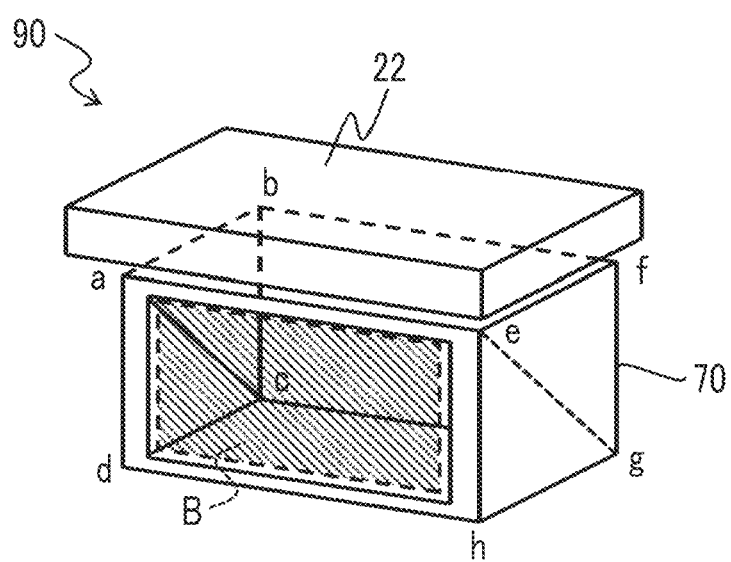
FIG. 21 is a descriptive diagram of an aerial image display apparatus of Comparative Example 1.

FIG. 21 illustrates a positional relationship among the image display unit 22, the casing 70, and the aerial image B in an aerial image display apparatus 90 of Comparative Example 1.

A corner cube array type retroreflective sheet (product name Nikkalite manufactured by Nippon Carbide Industries Co., Inc) is bonded to the inner side of the side surface bfgc of the casing 70. In addition, the retroreflective sheets Nikkalite are bonded to the inner side of the side surface abcd and the inner side of the side surface efgh such that the retroreflective sheets Nikkalite overlap with the triangle abc and a triangle efg.

Furthermore, a polycarbonate ¼ wavelength retardation film having a negative dispersibility (product name Pure Ace WR W-142 manufactured by Teijin Limited) is bonded to the surfaces of the three retroreflective sheets Nikkalite such that the angle formed between the slow axis of the polycarbonate ¼ wavelength retardation film and the bottom surface of the casing 70 is 45°.

Next, the anti-reflective polarization beam splitter 34 is installed at the position of a plane aegc such that the absorptive type polarization film 312 is on the bottom surface cghd side, and the wire-grid polarization film 314 is on the image display unit 22 side.

In addition, Kindle Fire HDX which is a tablet terminal manufactured by Amazon is installed on the upper surface abfe as the image display unit 22.

Accordingly, the aerial image display apparatus 90 of Comparative Example 1 is manufactured.

Comparative Example 2

Figure 22:
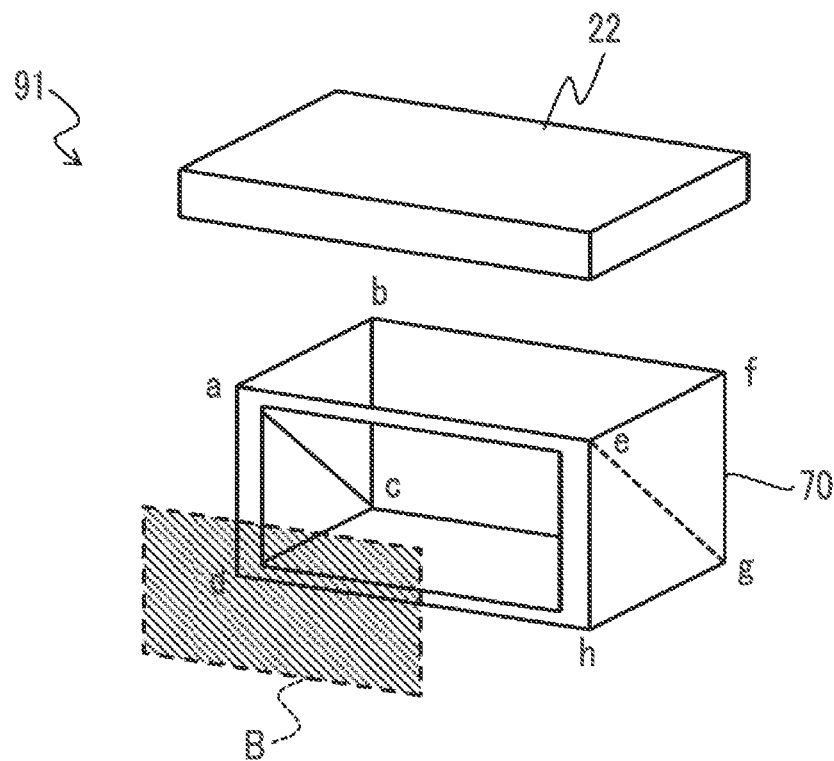
FIG. 22 is a descriptive diagram of an aerial image display apparatus of Comparative Example 2.

FIG. 22 illustrates a positional relationship among the image display unit 22, the casing 70, and the aerial image B in an aerial image display apparatus 91 of Comparative Example 2.

In the aerial image display apparatus 90 of Comparative Example 1, the tablet terminal Kindle Fire HDX is installed at a position of 19 cm above the upper surface abfe of the casing 70 as the image display unit 22. Accordingly, the aerial image display apparatus 91 of Comparative Example 2 is manufactured.

[Method of Evaluating Protrusion Distance of Aerial Image]

In the manufactured aerial image display apparatus, the distance from the surface aehd to the position at which the aerial image is formed is measured.

[Method of Evaluating Brightness]

The brightness is measured using the spectroradiometer "SR-3" manufactured by TOPCON TECHNOHOUSE CORPORATION by setting a focal point at the center of the aerial image from a direction perpendicular to the surface aehd of the manufactured aerial image display apparatus.

[Method of Evaluating Resolution]

In the manufactured aerial image display apparatus, a 5 mm square text string is displayed on the image display unit, and whether or not the text string in the aerial image is read with eyes is evaluated.

<Evaluation Standard>

A: The text string is read.

C: The text string is not read.

[Method of Evaluating Visual Recognition Range]

In the manufactured aerial image display apparatus, whether or not the observer can visually recognize the aerial image in the observation of the aerial image at a position at which the observer expects a specific surface of the casing 70 is evaluated. The evaluation is individually performed in a case where the specific surface is the surface bfgc, and in a case where the specific surface is the surface cghd.

<Evaluation Standard>

A: The aerial image can be visually recognized.

C: The aerial image cannot be visually recognized.

[Method of Evaluating Double Image]

In the manufactured aerial image display apparatus, whether or not a double image is visually recognized is evaluated.

<Evaluation Standard>

A: A double image is not visually recognized.

B: A slight double image is visually recognized.

C: A double image is visually recognized.

The configurations and the evaluation results of Examples 1 to 9 and Comparative Examples 1 and 2 are collectively shown in Table 1 and Table 2.

TABLE 1

| | Example 1 | Example 2 | Example 3 | Example 4 | Example 5 | Example 6 |
|---|---|---|---|---|---|---|
| Number of Aerial Image Display Apparatus | 81 | 82 | 83 | 84 | 85 | 86 |
| Beam Splitter | Beam Splitter 32 | Beam Splitter 32 | Beam Splitter 32 | Polarization Beam Splitter 33 | Polarization Beam Splitter 33 | Anti-Reflective Polarization Beam Splitter 34 |
| Mirror Surface | Flat Mirror | Flat Mirror | Flat Mirror | Flat Mirror ¼ Wavelength Retardation Film | Flat Mirror ¼ Wavelength Retardation Film | Flat Mirror ¼ Wavelength Retardation Film |
| Retroreflective Member | Bead Type | Corner Cube Array Type | Corner Cube Array Type | Corner Cube Array Type ¼ Wavelength Retardation Film | Corner Cube Array Type ¼ Wavelength Retardation Film | Corner Cube Array Type ¼ Wavelength Retardation Film |
| Emission Light from Image Display Unit | Elliptically Polarized Light | Elliptically Polarized Light | Elliptically Polarized Light | Elliptically Polarized Light | Linearly Polarized Light | Linearly Polarized Light |
| Protrusion Distance of Aerial Image [cm] | 9 | 9 | 9 | 9 | 9 | 9 |
| Brightness of Aerial Image [cd/m$^2$] | 7 | 8 | 9 | 18 | 36 | 40 |
| Resolution of Aerial Image [Readability of Text String] | C | A | A | A | A | A |
| Visual Recognition Range of Aerial Image — When Surface bfgc Is Expected | A | A | A | A | A | A |
| Visual Recognition Range of Aerial Image — When Surface cghd Is Expected | A | A | A | A | A | A |
| Double Image [A Denotes Case Where Double Image Is Not Visually Recognized] | C | C | C | C | B | A |

TABLE 2

| | Example 7 | Example 8 | Example 9 | Comparative Example 1 | Comparative Example 2 |
|---|---|---|---|---|---|
| Number of Aerial Image Display Apparatus | 87 | 88 | 89 | 90 | 91 |
| Beam Splitter | Anti-Reflective Circular Polarization Beam Splitter 35 | Anti-Reflective Polarization Beam Splitter 34 | Anti-Reflective Polarization Beam Splitter 34 | Anti-Reflective Polarization Beam Splitter 34 | Anti-Reflective Polarization Beam Splitter 34 |
| Mirror Surface | Flat Mirror | Flat Mirror ¼ Wavelength Retardation Film | Flat Mirror ¼ Wavelength Retardation Film | Not Present | Not Present |
| Retroreflective Member | Corner Cube Array Type | Corner Cube Array Type ¼ Wavelength Retardation Film | Corner Cube Array Type 1¼ Wavelength Retardation Film | Corner Cube Array Type ¼ Wavelength Retardation Film | Corner Cube Array Type ¼ Wavelength Retardation Film |
| Emission Light from Image Display Unit | Linearly Polarized Light | Linearly Polarized Light (Solid Image) | Linearly Polarized Light | Linearly Polarized Light | Linearly Polarized Light |
| Protrusion Distance of Aerial Image [cm] | 9 | 9 | 19 | 0 | 19 |
| Brightness of Aerial Image [cd/m$^2$] | 38 | 20 | 9 | 51 | 16 |
| Resolution of Aerial Image [Readability of Text String] | A | A | A | A | A |
| Visual Recognition Range of Aerial Image — When Surface bfgc Is Expected | A | A | A | A | A |

TABLE 2-continued

|  | Example 7 | Example 8 | Example 9 | Comparative Example 1 | Comparative Example 2 |
|---|---|---|---|---|---|
| When Surface cghd Is Expected | A | A | A | C | C |
| Double Image [A Denotes Case Where Double Image Is Not Visually Recognized] | A | A | A | A | A |

Any of the aerial image display apparatuses 81 to 88 of Examples 1 to 8 forms the aerial image at a position protruding approximately 9 cm in the forward direction from the surface aehd of the casing 70. Meanwhile, in the aerial image display apparatus 90 of Comparative Example 1, the aerial image does not protrude in the forward direction from the surface aehd.

Any of the aerial image display apparatus 89 of Example 9 and the aerial image display apparatus 91 of Comparative Example 2 forms the aerial image at a position protruding approximately 19 cm in the forward direction from the surface aehd of the casing 70. However, while the height of the whole aerial image display apparatus 91 of Comparative Example 2 is approximately 29 cm, the height of the whole aerial image display apparatus 89 of Example 9 is restricted to approximately 20 cm.

The aerial image display apparatus 82 of Example 2 has a high resolution of the aerial image and a high visibility of the text string, compared to Example 1. The reason is that the corner cube array sheet is used as the retroreflective member.

The aerial image display apparatus 83 of Example 3 has an improved brightness of the aerial image, compared to Example 2. The reason is that the retroreflective member is installed on not only the side surface bfgc but also the side surface abcd and the side surface efgh.

The aerial image display apparatus 84 of Example 4 has a further improved brightness of the aerial image, compared to Example 3. The reason is that unnecessary reflection and transmission of the light rays are restricted using the polarization beam splitter and the ¼ wavelength retardation film.

The aerial image display apparatus 85 of Example 5 has a further improved brightness of the aerial image, compared to Example 4. In addition, a double image is effectively reduced. The reason is that unnecessary reflection of the light rays in the beam splitter is reduced using the image display device emitting linearly polarized light as the image display unit.

In the aerial image display apparatus 86 of Example 6, a double image is not visually recognized, and the visibility of the aerial image is favorable. The reason is that reflection of the light rays on the surface of the beam splitter is reduced using the anti-reflective polarization beam splitter 34.

The aerial image display apparatus 87 of Example 7 shows the quality of the brightness and the visibility of the aerial image equivalent to Example 6.

In the aerial image display apparatus 88 of Example 8, the aerial image enabling a solid view with the naked eye is obtained.

What is claimed is:

1. An optical apparatus comprising:
    a beam splitter that transmits a part of an incidence ray and reflects another part of the incidence ray;
    a mirror member that includes a mirror surface arranged at a position at which light transmitted through the beam splitter is incident;
    a retroreflective member that is arranged at a position at which light specularly reflected on the mirror surface, to be incident on the beam splitter and specularly reflected by the beam splitter, is incident; and
    an installation unit at which an object to be projected is installed on an opposite side of the beam splitter from the mirror member,
    wherein an image of the object to be projected that is installed at the installation unit is formed at a position that is optically conjugate with the object to be projected.

2. The optical apparatus according to claim 1,
    wherein an image display unit, that displays an image as the object to be projected, is installed at the installation unit.

3. The optical apparatus according to claim 2,
    wherein the image display unit is an image display device emitting polarized light.

4. The optical apparatus according to claim 2,
    wherein the image display unit is a liquid crystal display device or an organic electro luminescence display device.

5. The optical apparatus according to claim 1,
    wherein the beam splitter includes a polarization-selective reflective material.

6. The optical apparatus according to claim 5,
    wherein the polarization-selective reflective material is a reflective type polarizer.

7. The optical apparatus according to claim 6,
    wherein the beam splitter includes an absorptive type polarizer, directions of transmission axes of the reflective type polarizer and the absorptive type polarizer are the same, and the reflective type polarizer is installed closer to a mirror member side than the absorptive type polarizer is.

8. The optical apparatus according to claim 1,
    wherein at least one surface of the beam splitter on which the light is incident is subjected to anti-reflective processing.

9. The optical apparatus according to claim 1,
    wherein a polarization conversion element is installed on the mirror surface of the mirror member.

10. The optical apparatus according to claim 9,
    wherein the polarization conversion element is a ¼ wavelength retardation plate.

11. The optical apparatus according to claim 1,
    wherein the retroreflective member is a retroreflective member in which multiple corner cube reflectors are arranged.

12. The optical apparatus according to claim 1,
wherein a polarization conversion element is installed on a light incidence surface of the retroreflective member.

13. The optical apparatus according to claim 12,
wherein the polarization conversion element is a ¼ wavelength retardation plate.

* * * * *